(12) United States Patent
Weng et al.

(10) Patent No.: US 8,639,509 B2
(45) Date of Patent: Jan. 28, 2014

(54) METHOD AND SYSTEM FOR COMPUTING OR DETERMINING CONFIDENCE SCORES FOR PARSE TREES AT ALL LEVELS

(75) Inventors: Fuliang Weng, Mountain View, CA (US); Feng Lin, Shanghai (CN); Zhe Feng, Palo Alto, CA (US)

(73) Assignee: Robert Bosch GmbH, Stuttgart (DE)

( * ) Notice: Subject to any disclaimer, the term of this patent is extended or adjusted under 35 U.S.C. 154(b) by 1701 days.

(21) Appl. No.: 11/881,464

(22) Filed: Jul. 27, 2007

(65) Prior Publication Data

US 2009/0030686 A1  Jan. 29, 2009

(51) Int. Cl.
*G10L 15/04* (2013.01)
*G10L 15/08* (2006.01)
*G10L 13/06* (2013.01)
*G10L 13/08* (2013.01)

(52) U.S. Cl.
USPC ............................ 704/252; 704/251; 704/236

(58) Field of Classification Search
USPC ................. 704/231–232, 235–240, 243–245, 704/251–254, E15.001–E15.05, 704/E13.011–E13.014
See application file for complete search history.

(56) References Cited

U.S. PATENT DOCUMENTS

| | | | | |
|---|---|---|---|---|
| 5,510,981 A * | 4/1996 | Berger et al. | ...................... | 704/2 |
| 5,748,841 A * | 5/1998 | Morin et al. | ................... | 704/257 |
| 5,761,631 A * | 6/1998 | Nasukawa | .......................... | 704/9 |
| 5,930,746 A * | 7/1999 | Ting | ................... | 704/9 |
| 6,243,669 B1 * | 6/2001 | Horiguchi et al. | ................. | 704/9 |
| 6,434,628 B1 * | 8/2002 | Bowman-Amuah | ............ | 714/48 |
| 7,143,036 B2 * | 11/2006 | Weise | ............................ | 704/245 |
| 7,200,550 B2 * | 4/2007 | Menezes et al. | ................. | 704/10 |
| 7,593,843 B2 * | 9/2009 | Aue et al. | ........................... | 704/2 |
| 7,639,881 B2 * | 12/2009 | Viola et al. | ..................... | 382/226 |
| 2003/0046073 A1 * | 3/2003 | Mori et al. | ..................... | 704/251 |
| 2003/0212543 A1 * | 11/2003 | Epstein et al. | .................... | 704/9 |
| 2004/0193401 A1 * | 9/2004 | Ringger et al. | .................... | 704/9 |
| 2005/0015217 A1 * | 1/2005 | Weidl et al. | .................... | 702/185 |
| 2005/0049852 A1 * | 3/2005 | Chao | ................................ | 704/9 |
| 2005/0055209 A1 * | 3/2005 | Epstein et al. | ................. | 704/255 |
| 2005/0149326 A1 * | 7/2005 | Hogengout et al. | .......... | 704/242 |
| 2005/0234707 A1 * | 10/2005 | Luo et al. | .......................... | 704/9 |
| 2005/0237227 A1 * | 10/2005 | Ittycheriah et al. | ............... | 341/1 |
| 2005/0256715 A1 * | 11/2005 | Okimoto et al. | ............. | 704/257 |
| 2006/0004563 A1 * | 1/2006 | Campbell et al. | ................. | 704/9 |
| 2006/0074670 A1 * | 4/2006 | Weng et al. | ................... | 704/257 |
| 2006/0095248 A1 * | 5/2006 | Menezes et al. | .................. | 704/3 |
| 2006/0095250 A1 * | 5/2006 | Chen et al. | ........................ | 704/9 |

(Continued)

OTHER PUBLICATIONS

Chelba et al. "Exploiting Syntactic Structure for Language Modeling." Proceedings of the 17th International Conference on Computational Linguistics. pp. 225-231. 1998.*

(Continued)

*Primary Examiner* — Pierre-Louis Desir
*Assistant Examiner* — David Kovacek
(74) *Attorney, Agent, or Firm* — Kenyon & Kenyon LLP

(57) ABSTRACT

In a confidence computing method and system, a processor may interpret speech signals as a text string or directly receive a text string as input, generate a syntactical parse tree representing the interpreted string and including a plurality of sub-trees which each represents a corresponding section of the interpreted text string, determine for each sub-tree whether the sub-tree is accurate, obtain replacement speech signals for each sub-tree determined to be inaccurate, and provide output based on corresponding text string sections of at least one sub-tree determined to be accurate.

37 Claims, 13 Drawing Sheets

(56) References Cited

U.S. PATENT DOCUMENTS

| | | | |
|---|---|---|---|
| 2006/0245641 A1* | 11/2006 | Viola et al. | 382/155 |
| 2006/0271364 A1* | 11/2006 | Mirkovic et al. | 704/239 |
| 2006/0277028 A1* | 12/2006 | Chen et al. | 704/4 |
| 2007/0016398 A1* | 1/2007 | Buchholz | 704/4 |
| 2007/0083357 A1* | 4/2007 | Moore et al. | 704/4 |
| 2007/0100624 A1* | 5/2007 | Weng et al. | 704/257 |
| 2007/0192085 A1* | 8/2007 | Roulland et al. | 704/9 |
| 2007/0225977 A1* | 9/2007 | Emam et al. | 704/235 |
| 2009/0030686 A1* | 1/2009 | Weng et al. | 704/240 |

OTHER PUBLICATIONS

"Statistical Parsing with Context-Free Filtering Grammar." Demko, Michael Patrick. University of Toronto (Canada), ProQuest, UMI Dissertations Publishing, 2007. MR40110.*

Ammicht et al., "Ambiguity Representation and Resolution in Spoken Dialogue Systems," Proc. Eurospeech (2001), 4 pages.

Berger et al., "A Maximum Entropy Approach to Natural Language Processing," Computational Linguistic, 22 (1): 39-71 (1996).

Bies et al., "Bracketing Guidelines for Treebank II Style Penn Treebank Project", Jan. 1995, pp. 1-317.

Charniak et al., "Coarse-to-Fine N-Best Parsing and MaxEnt Discriminative Reranking," Proceedings of the 43$^{rd}$ Annual Meeting of the Association for Computational Linguistics (ACL 2005), pp. 173-180).

Collins, "Discriminative Reranking for Natural Language Parsing," Machine Learning: Proceedings of the Seventh International Conference, (ICML 2000), pp. 175-182.

Guillevic et al., "Robust Semantic Confidence Scoring," Proc. ICSLP, pp. 853-856 (2002).

Lamel et al., "The LIMSI ARISE System." IVTTA (1998), Torino, pp. 1-35.

San-Segundo et al., "Confidence Measures for Spoken Dialogue Systems," ICASSP (2001), 4 pages.

Wang et al., "Error-Tolerant Spoken Language Understanding with Confidence Measuring," ICSLP (2002), 4 pages.

Weng et al., "CHAT: A Conversational Helper for Automotive Tasks," Proceedings of the 9$^{th}$ International Conference on Spoken Language Processing (Interspeech/ICSLP), pp. 1061-1064, Pittsburgh, PA (Sep. 2006), 4 pages.

Weintraub et al., "Neural Network Based Measures of Confidence for Word Recognition," Proc. ICASSP-97, vol. 2 (1997), 4 pages.

Zhang et al., "A Progressive Feature Selection Algorithm for Ultra Large Feature Spaces," Proceedings of the 21$^{st}$ International Conference on Computational Linguistics and the 44$^{th}$ Annual Meeting of the ACL, pp. 561-568, Sydney, Australia (2006).

Zhang et al., "Word Level Confidence Annotation Using Combinations of Features," Proc. Eurospeech, Aalborg, pp. 2105-2108 (2001).

Zhou et al., "A Fast Algorithm for Feature Selection in Conditional Maximum Entropy Modeling," Proceedings of Empirical Methods in Natural Language Processing, Sapporo, Japan (Jul. 11-12, 2003), 7 pages.

* cited by examiner

METHOD AND SYSTEM FOR COMPUTING OR DETERMINING CONFIDENCE SCORES FOR PARSE TREES AT ALL LEVELS

COPYRIGHT NOTICE

A portion of the disclosure of this patent document contains material that is subject to copyright protection. The copyright owner has no objection to the facsimile reproduction by anyone of the patent document or patent disclosure as it appears in the Patent and Trademark Office, patent file or records, but otherwise reserves all copyright rights whatsoever.

FIELD OF THE INVENTION

The present invention relates to a confidence computing system and method for determining accuracy of the recognition of portions of input text.

BACKGROUND INFORMATION

Speech recognition may be defined as the process of converting a spoken waveform into a textual string of words, such as, for example, a sentence expressed in the English language. In a front-end phase, "raw" speech signals are spectrally analyzed and converted into a sequence of feature vectors (observations). In an acoustic modeling phase, the sequence of feature vectors is examined to extract phone sequences (e.g., simple vowel or consonant sounds) using knowledge about acoustic environments, gender and dialect differences, and phonetics. In a language modeling phase, the phone sequences are converted into corresponding word sequences using knowledge of what constitutes a possible word, what words are likely to occur, and in what sequence. A spoken language processing system makes use of the word sequences from the speech recognition system and produces different levels of meaning representations. Examples of such spoken language processing systems include spoken language understanding, information extraction, information retrieving, or dialogue systems.

Due to the complexity and intricacies of language combined with varied acoustic environments, speech recognition systems face significant challenges in realizing a truly human-like speech recognition system. For example, a speech recognition system must contend with lexical and grammatical complexity and variations of spoken language as well as the acoustic uncertainties of different accents and speaking styles. A speech recognition system's determination from the spoken waveforms of a speech element, such as a word or sentence is therefore often incorrect.

Therefore, the speech recognition system calculates a degree of confidence, referred to herein as a confidence score, for the determined speech elements. If the calculated score is low, a spoken dialogue system that uses the speech recognition system may discard the determined speech elements and, for example, requests new input. For example, the system may output a message requesting the speaker to repeat a word or sentence.

Indeed, there has been considerable interest in the speech recognition community in obtaining confidence scores for recognized words (see, e.g., Weintraub et al., *Neural Network Based Measures of Confidence for Word Recognition*, Proc. ICASSP-97, Vol. 2, pages 887-890 (1997); Zhang et al., *Word Level Confidence Annotation Using Combinations of Features*, Proc. Eurospeech, Aalborg, pages 2105-2108 (2001)) or utterances (see, e.g., San-Segundo et al., *Confidence Measures for Spoken Dialogue Systems*, ICASSP (2001); Wang et al. *Error-Tolerant Spoken Language Understanding with Confidence Measuring*, ICSLP-2002). Computing confidence scores at the concept-level may have gained more attention due to increased research activities and real world applications in dialogue and information retrieving and extraction (see, e.g., Ammicht et al. *Ambiguity Representation and Resolution in Spoken Dialogue Systems*, Proc. Eurospeech (2001); Guillevic et al., *Robust Semantic Confidence Scoring*, Proc. ICSLP, pages 853-856 (2002)).

To calculate the confidence score, the speech recognition system inputs a set of data into a statistical model, e.g., a maximum entropy model (see, e.g., Berger et al., *A Maximum Entropy Approach to Natural Language Processing*, Computational Linguistic, 22 (1): 39-71 (1996); Zhou et al., *A Fast Algorithm for Feature Selection in Conditional Maximum Entropy Modeling*, Proceedings of Empirical Methods in Natural Language Processing, Sapporo, Japan (Jul. 11-12, 2003)), which outputs the confidence score. The input data set may include numerous features that bear upon the organization of a speech element. For each different feature, a different weighting may be applied so that certain features bear more strongly on the calculation than others.

For example, the maximum entropy model outputs a probability that the input signals represent a particular speech element y given an observation x subject to constraints set by a set of selected features $f_i(x, y)$, where $f_i(x,y)$ is a feature function (or feature for short) that describes a certain acoustic, linguistic, or other event (x,y). For a particular observation, particular ones of the features are either present (1) or absent (0). The maximum entropy model may take the form of $$p(y\mid x) = \frac{1}{Z(x)}\exp\left(\sum_j \lambda_j f_j(x, y)\right),$$

where $\lambda_j$ is a weight assigned to a feature $f_j$ indicating how important the feature $f_j$ is for the model, $Z(x)$ is a normalization factor, and $p(y|x)$ is the resulting conditional probability.

Conventional spoken language processing systems, driven mostly by relatively simple dialogue, information retrieving, and information extraction applications, are limited to computation of confidence scores at only a word level, a domain dependent semantic slot or concept level, e.g., where "New York" is a single semantic slot in a travel related domain, or sentence/utterance level that focuses on special phrases for a task context of the speech recognition system.

The confidence score computation algorithms at the three levels, i.e., word, concept, and sentence, may achieve good results when applied to relatively simple spoken language processing systems, including simple dialogue systems, such as command-n-control, or slot-based dialogue systems. For more sophisticated dialogue systems (see, e.g., Weng et al., *CHAT: A Conversational Helper for Automotive Tasks*, Proceedings of the 9th International Conference on Spoken Language Processing (Interspeech/ICSLP), pages 1061-1064, Pittsburgh, Pa. (September 2006)), however, use of the three level confidence score paradigm may result in ineffective and annoying dialogues. For example, the system might constantly ask a user to repeat the user's request numerous times since the system only identifies individual words or whole sentences in which the system does not have confidence, and thus requires the user to repeat the entire sentence.

SUMMARY OF THE INVENTION

Exemplary embodiments and/or methods of the present invention provide a confidence computing system and method that may identify reliable and unreliable regions of a parse tree at all structural levels, i.e., all sub-trees. The later stage processing systems or methods may therefore provide more effective and friendly dialogues, or more precise information searching, retrieving, and extraction. Where confidence in particular regions of the parse tree is low, the next stage dialogue system and method may limit an instruction for the user to repeat a request to particular phrases of the sentence the user previously uttered.

For example, if a user inputs a request "Play a rock song by Cher," computation of confidence scores for every word, the artist name "Cher," and the entire sentence would not enable the system to determine that low confidence is limited to the phrase "a rock song" and therefore would not enable the system to communicate to the user that the system is not confident of the phrase "a rock song." However, according to embodiments of the present invention in which confidence scores may be computed for all levels of a parse tree, the system may determine that it is only the phrase "a rock song" that has a low confidence.

The exemplary embodiments and/or methods of the present invention provide a confidence computing system and method that computes for, and assigns to, each parse sub-tree a respective confidence score. The system and method may use the computed confidence scores to identify reliable regions of the parse tree more precisely, and thereby conduct more effective dialogues, than prior art systems. In computing confidence scores for each parse tree level, three rich sets of features may be used: acoustic, syntactic, and semantic features.

In an example embodiment and/or method of the present invention, for each parse sub-tree, the system and method may input a feature set representative of the parse sub-tree into a statistical model used for output of the parse sub-tree's confidence score. A conditional maximum entropy (CME) model is one exemplary statistical model that may be used as the statistical model. Other models, e.g., created based on statistical methods other than CME may also be used. In the statistical model, different features of the feature set may be assigned different weights for weighted consideration.

The features may include a word-level confidence score, a part-of-speech (POS) tag score, a linking score, a history score which includes scores of sub-levels of the respective parse sub-tree, syntactic features, and/or semantic features. Similar features outside and/or surrounding the parse sub-tree may also be included in the modeling process. The term "surrounding" as used herein may include left and/or right of the parse sub-tree.

The exemplary embodiments and/or methods of the present invention provide for introducing a new set of syntactic features that represent structural aspects of the parse sub-trees, use of which as input into a statistical model provides for accurate computation of confidence scores for each parse sub-tree.

An example method of the present invention may provide a confidence computing method, which may include: (a) generating a syntactical parse tree for an interpreted text string, the parse tree including a plurality of sub-trees, each of the sub-trees representing a corresponding section of the interpreted text string; (b) for each sub-tree, determining whether the respective sub-tree is accurate; and (c) subsequent to a determination, for at least one of the sub-trees, that the at least one sub-tree is accurate, providing an output based on the at least one sub-tree's at least one corresponding section of the interpreted text string.

One example method of the confidence computing method may further include: prior to (a), (d) interpreting first speech signals as the interpreted text string; and, in (b), conditional upon a determination that the respective sub-tree is inaccurate, obtaining replacement speech signals for replacing the respective sub-tree and the respective sub-tree's corresponding section.

In one variant of this method, the confidence computing method may further include, in (b), for the accuracy determination: computing a respective confidence score characterizing a probability of the respective sub-tree's accuracy; and determining whether the respective confidence score meets a predetermined threshold value. The respective sub-tree may be determined to be accurate if it is determined that the respective sub-tree's confidence score meets the threshold value. The respective sub-tree may otherwise be determined to be inaccurate.

In another variant of this method, the confidence computing method may further include performing (d) to (b) for the replacement speech signals.

In yet another variant of this method, the confidence computing method may further include, for each sub-tree, extracting at least one feature of the respective sub-tree. The confidence score of the respective sub-tree may be computed using a statistical model into which the at least one extracted feature is input.

In another variant of this method, the statistical model may be a maximum entropy model.

In another variant of this method, the confidence computing method may further include assigning a POS tag to each word in the interpreted text string, wherein the syntactical parse tree represents the assignment of the POS tags.

In another variant of this method, the at least one feature may include at least one of a set of features including: a parse-tree-word-level confidence score calculated based on respective word-level confidence scores of a plurality of words of the respective sub-tree; a POS-tag confidence score based on respective POS-tag scores computed for the POS tag assignments of the plurality of words of the respective sub-tree; a linking score representing a conditional probability of a link of a highest level of the respective sub-tree, the link including a dependency relation and a directionality; a history score which includes, for each of at least one child sub-tree of the respective sub-tree, the respective child sub-tree's previously computed confidence score; each of a plurality of words of the respective sub-tree's corresponding section of the interpreted text; each of the plurality of POS tags corresponding to the plurality of words of the respective sub-tree's corresponding section of the interpreted text; each of a plurality of multi-level hierarchical POS tags corresponding to the plurality of words of the respective sub-tree's corresponding section of the interpreted text; a dependency relation characteristic; a Single Level Joint Head and Dependency Relation (SL-JHD) characteristic; a Single Level Joint Mod and Dependency Relation (SL-JMD) characteristic; a Single Level Joint Head, Mod, and Dependency Relation (SL-JHMD) characteristic; a Joint Dependency Relation (JDR) characteristic; a Multi-Level Joint Head and Dependency Relation (ML-JHD) characteristic; a Multi-Level Joint Mod and Dependency Relation (ML-JMD) characteristic; a Multi-Level Joint Head, Mod, and Dependency Relation (ML-JHMD) characteristic; a Head, Dependency, and Left and Right Neighbors (HDLRN) characteristic; a sub-tree size characteristic; and a semantic slot feature.

In another variant of this method, the at least one feature may include a combination of at least two of the set of features in addition to the at least one of the set.

In yet another variant of this method, the at least one feature may include three dependency relation characteristics, including a first dependency relation of the highest level of the respective sub-tree, and a second and a third dependency relation, each of a next to highest level of the respective sub-tree.

In yet another variant of this method, the at least one feature may include nine SL-JHD features, including three for each of the highest level of the respective sub-tree and left and right child sub-trees corresponding to a level immediately below the highest level of the respective sub-tree.

In yet another variant of this method, the at least one feature may include nine SL-JMD features, including three for each of the highest level of the respective sub-tree and left and right child sub-trees corresponding to a level immediately below the highest level of the respective sub-tree.

In yet another variant of this method, the at least one feature may include nine SL-JHMD features, including three for each of the highest level of the respective sub-tree and left and right child sub-trees corresponding to a level immediately below the highest level of the respective sub-tree.

In yet another variant of this method, the at least one feature may include three sets of JDR features including: a first set that includes all dependency relations of all levels of the respective sub-tree; a second set that includes all dependency relations of all levels of a left sub-tree, the left sub-tree corresponding to a level immediately below the highest level of the respective sub-tree; and a third set that includes all dependency relations of all levels of a right sub-tree, the right sub-tree corresponding to the level immediately below the highest level of the respective sub-tree.

In yet another variant of this method, the at least one feature may include three ML-JHD features, including one for each of the highest level of the respective sub-tree and left and right child sub-trees corresponding to a level immediately below the highest level of the respective sub-tree.

In yet another variant of this method, the at least one feature may include three ML-JMD features, including one for each of the highest level of the respective sub-tree and left and right child sub-trees corresponding to a level immediately below the highest level of the respective sub-tree.

In yet another variant of this method, the at least one feature may include three ML-JHMD features, including one for each of the highest level of the respective sub-tree and left and right child sub-trees corresponding to a level immediately below the highest level of the respective sub-tree.

In yet another variant of this method, the at least one feature may include the sub-tree size characteristic, and the sub-tree size characteristic may include: a first value equal to a number of pre-terminals of the respective sub-tree; a second value equal to a number of non-terminals of a left child sub-tree corresponding to a level immediately below the highest level of the respective sub-tree; and a third value equal to a number of non-terminals of a right child sub-tree corresponding to the level immediately below the highest level of the respective sub-tree.

An example embodiment of the present invention may provide a computer-readable medium having stored thereon instructions adapted to be executed by a processor, the instructions which, when executed, cause the processor to perform a confidence computing method by performing the following: (a) generating a syntactical parse tree representing an interpreted text string, the parse tree including a plurality of sub-trees, each of the sub-trees representing a corresponding section of the interpreted text string; (b) for each sub-tree, determining whether the respective sub-tree is accurate; and (c) subsequent to a determination, for at least one of the sub-trees, that the at least one sub-tree is accurate, providing an output based on the at least one sub-tree's at least one corresponding section.

An example embodiment of the present invention may provide a confidence computing system, including a processor configured to: (a) interpret first speech signals as a text string; (b) generate a syntactical parse tree representing the interpreted text string, the parse tree including a plurality of sub-trees, each of the sub-trees representing a corresponding section of the interpreted text string; (c) for each sub-tree: determine whether the respective sub-tree is accurate; and conditional upon a determination that the respective sub-tree is inaccurate, obtain replacement speech signals for replacing the respective sub-tree and the respective sub-tree's corresponding section; and (d) subsequent to a determination, for at least one of the sub-trees, that the at least one sub-tree is accurate, provide an output based on the at least one sub-tree's at least one corresponding section.

Experiments with various feature combinations have been conducted and analyzed. Using CME classifiers for two category output of "correct" and "incorrect" with all the features, the experiment results reached an annotation error rate of only 5.1% on the test data. This is a 42.0% relative reduction in error rate compared to a method using some baseline features.

DETAILED DESCRIPTION OF EXAMPLE EMBODIMENTS

Figure 1:
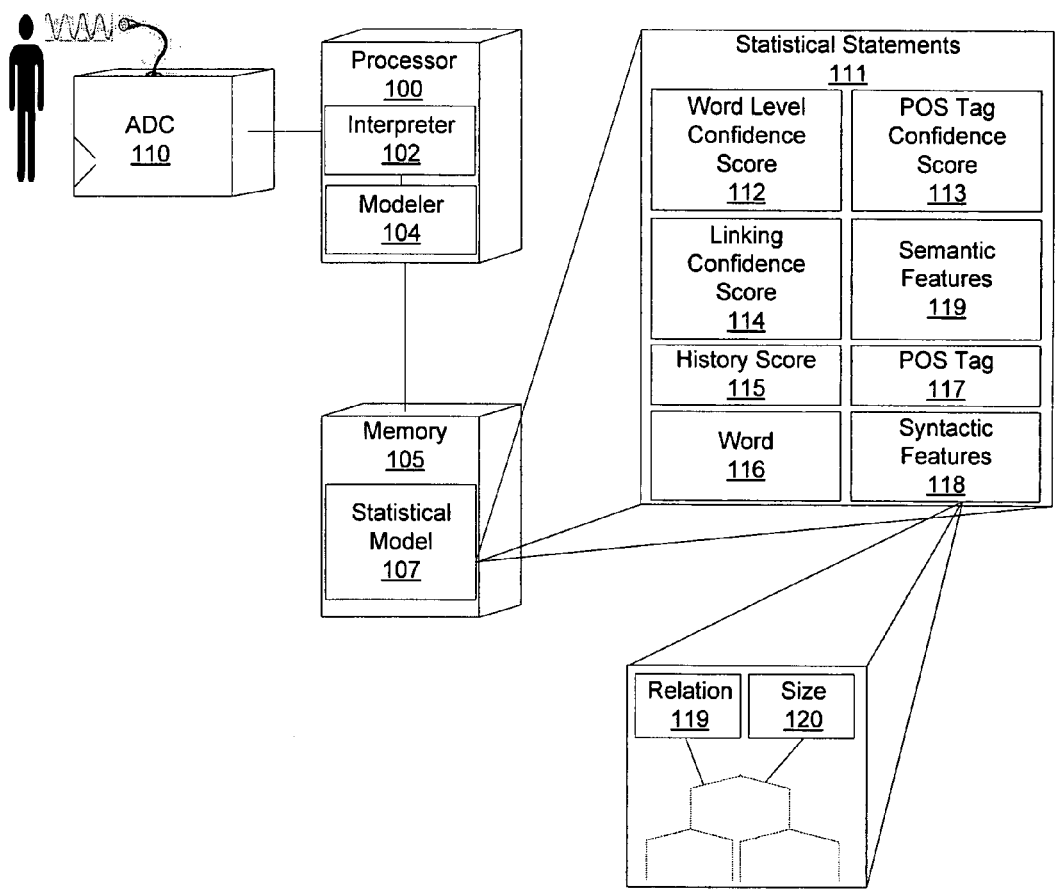
FIG. 1 is a block diagram that illustrates components of a confidence computing system, according to an example embodiment and/or method of the present invention.

FIG. 1 is a block diagram that illustrates components of a confidence computing system for performing the methods disclosed herein. The system may include an analog-to-digital converter (ADC) 110 which may receive analog signals representing speech input from a user and convert the signals to digital signals. The ADC 110 may pass the converted signals to a processor 100. The processor 100 may include an interpreter 102 and a modeler 104. The interpreter 102 may include a speech recognizer and a statistical parser for interpreting the signals as words and constructing a parse tree representing a sentence determined by the interpreter 102 to be the user's speech input. For example, the Nuance V8.5 system may be used to perform this speech recognition. The interpreter 102 may pass the parse tree to the modeler 104. The modeler 104 may, for each sub-tree of the parse tree (including the entire parse tree as a whole), extract from the parse tree a set of features representing the respective parse sub-tree. For each parse sub-tree, the modeler 104 may input the features of the respective parse sub-tree into a statistical model 107, e.g., a CME model, stored in a memory 105 and determine, based on the statistical model 107, the posterior probability of the parse sub-tree given the set of input features.

The statistical model 107 may be constructed as a set of statistical statements 111 regarding features of potential parse trees. The features may include a word level confidence score 112, a POS tag confidence score 113, a linking confidence score 114, a history score 115, a word feature 116, a POS tag feature 117, a set of syntactic features 118, and a semantic feature 121. The set of syntactic features 118 may include a plurality of parse tree relation features 119 and a parse tree size feature 120.

The statistical model may include a weight factor assigned to each feature of the model. The statements 111 and/or the weight factors may be set during a conventional training procedure which may be manually and/or automatically performed. For example, during the training procedure, numerous features, e.g., 100,000 features, may be extracted from training data, which may be input into a CME modeling process. The CME model may select a subset of the input features, e.g., 1,000 features, as useful features and set for each selected feature a respective weight. The CME model may set the weights of the remaining features to 0, i.e., discard the remaining features.

Figure 2:
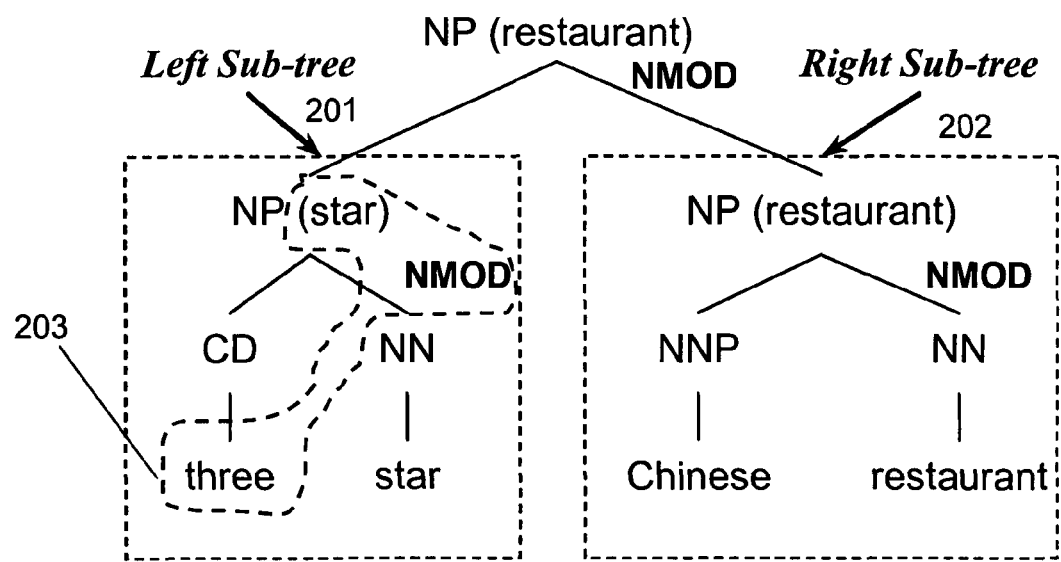
FIG. 2 shows an exemplary parse sub-tree and a link for which a linking score may be calculated, according to an example embodiment and/or method of the present invention.

The parse trees output by the processor 100 may be essentially lexicalized binary trees. In a parsing algorithm executed by the processor 100, left and right sub-trees may be joined with a head-marked information based on a probabilistic model. An example of the parse tree for the phrase "three star Chinese restaurant" is shown in FIG. 2, in which "restaurant" is marked as the head of the overall parent parse sub-tree, "star" is marked as the head of the left child sub-tree, and "restaurant" is marked as the head of the right child sub-tree. In any parse structure, the number of trees (including all sub-trees) corresponds to the number of non-terminals in the parse structure. A non-terminal corresponds to a phrase. For example, the parse structure shown in FIG. 2 includes three non-terminals, i.e., NP (restaurant), NP (star), and NP (restaurant), so that the parse structure includes three trees, i.e., one parent tree and two child sub-trees.

The confidence of a sub-tree is defined as the posterior probability of the sub-tree's accuracy, given all the input information related to the parse sub-tree, including the results of the interpreter 102, and is represented by the mathematical term p(sp is correct|x), where p means "probability that", sp is the sub-tree parse, and x is the given related information.

This probability may be determined using the CME modeling method:

$$P(y|x) = \frac{1}{Z(x)} \exp\left(\sum_j \lambda_j f_j(x, y)\right) \quad (1)$$

where $y \in \{\text{true}, \text{false}\}$, x is the acoustic, syntactic, and/or semantic context of the parse sub-tree, $f_j$ are the features, $\lambda_j$ are corresponding weights, and $Z(x)$ is the normalization factor. Accordingly, for each extracted feature of a parse tree or sub-tree, the feature may be included in the CME model with an applied respective weight. The system and method of the present invention may provide for including in the model only those features that are extracted, i.e., y=true for the included features.

Exemplary embodiments and/or methods of the present invention may provide that for determining the parse sub-tree confidence scores, a statistical model is used that is constructed of three major feature categories, which include score features, lexical-syntactic features, and semantic features. Combinations of these features may also be included for consideration.

Score Features

Example embodiments of the present invention may consider score features which may include scores from various sources, such as word-level confidence, POS tag confidence, linking confidence, and history.

Word-Level Confidence Score

In an example embodiment of the present invention, the processor 100 may provide a confidence score for each recognized word (referred to herein as the "word-level confidence score"), which is the probability that the respective word has been recognized correctly by the interpreter 102.

The processor 100 may then compute a word-level confidence score for a given parse sub-tree as a whole based on the individual word-level confidence scores. For example, the processor 100 may compute as the sub-tree's word-level confidence score the algorithmic mean of the word-level confidence scores of each lexical word of the sub-tree:

$$SCScore(subtree) = \frac{1}{n} \sum_{i=1}^{n} \text{confidence}(word_i) \quad (2)$$

where n is the length of the text string covered by the sub-tree. The system of the present invention may input as a feature the sub-tree's computed word-level confidence score into the statistical model for computing the confidence score of the respective parse sub-tree. In addition, confidence scores of the words surrounding, structurally related to, or semantically related to the parse sub-tree in the same or adjacent utterances may also be included as features.

POS Tag Score

In an example embodiment of the present invention, the processor 100 may assign to each word a POS tag, e.g., based on a CME model using a Viterbi algorithm, which labels the respective word's part of speech. Additionally, the processor 100 may assign phrase tags to phrases. Provided below in Table 1 is a list of some POS tags which may be assigned to recognized words, and their meanings. Also provided below in Tables 2 and 3 are lists of some phrase tags and relation tags. In a parse-tree, e.g., as shown in FIG. 2, the POS word tags are those appearing as pre-terminals, the phrase tags are those appearing as non-terminals, and the relation tags are those indicating the relationship between the corresponding head word and its modifier word. The pre-terminal POS tag is the one assigned to the word at its lowest parse structure level.

TABLE 1

POS word tags

| | |
|---|---|
| CC | Coordinating conjunction |
| CD | Cardinal number |
| DT | Determiner |
| EX | Existential there |
| FW | Foreign word |
| IN | Preposition or subordinating conjunction |
| JJ | Adjective |
| JJR | Adjective, comparative |
| JJS | Adjective, superlative |
| LS | List item marker |
| MD | Modal |
| NN | Noun, singular or mass |
| NNS | Noun, plural |
| NNP | Proper noun, singular |
| NNPS | Proper noun, plural |
| PDT | Predeterminer |
| POS | Possessive ending |
| PRP | Personal pronoun |
| PRP$ | Possessive pronoun |
| RB | Adverb |
| RBR | Adverb, comparative |
| RBS | Adverb, superlative |
| RP | Particle |
| SYM | Symbol |
| TO | to |
| UH | Interjection |
| VB | Verb, base form |
| VBD | Verb, past tense |
| VBG | Verb, gerund or present participle |
| VBN | Verb, past participle |
| VBP | Verb, non-$3^{rd}$ person singular present |
| VBZ | Verb, $3^{rd}$ person singular present |
| WDT | Wh-determiner |
| WP | Wh-pronoun |
| WP$ | Possessive wh-pronoun |
| WRB | Wh-adverb |

TABLE 2

Phrase Tags

| | |
|---|---|
| ADJP | Adjective phrase |
| ADVP | Adverb phrase |
| NP | Noun phrase |
| PP | Prepositional phrase |
| VP | Verb phrase |

TABLE 3

Relation Tags

| | |
|---|---|
| OBJ | Object |
| SBJ | Subject |
| NCOMP | Noun phrase complement |
| NMOD | Noun modifier |
| POBJ | Object of preposition |

The processor 100 may compute for each pre-terminal POS tag a confidence score representing the probability that the assigned POS tag is correct. The processor 100 may further compute a POS tag score for each parse sub-tree. For example, the POS tag score for a parse sub-tree (which may correspond to a phrase tag score for the phrase tag of the top level of the parse sub-tree) may be computed as the geometric mean of the individual scores:

$$PostagScore(subtree) = \left(\prod_{j=1}^{n} p(\text{tag}_j \mid W_j)\right)^{1/n} \quad (3)$$

where n is the number of all the lexical words covered by the parse sub-tree. The system of the present invention may input as a feature the sub-tree's computed POS tag confidence score into the statistical model for computing the confidence score of the respective parse sub-tree. In one example embodiment and/or method of the present invention, where the considered parse sub-tree includes child sub-trees, three such sub-tree POS tag scores may be included as features, including the POS tag score of the considered parse sub-tree and the POS tag score of the immediate children of the considered POS tag sub-tree. For example, for the parse sub-tree of FIG. 2, the POS tag scores of "three star Chinese restaurant," "three star," and "Chinese restaurant" may be included as features. Similar to the word-level confidence scores, POS tag scores of the words surrounding, structurally related to, or semantically related to the parse sub-tree in the same or adjacent utterances may also be included as features.

Linking Score

In an example embodiment of the present invention, the processor 100 may compute or determine for each parse sub-tree a respective linking score which represents the conditional probability of the highest link of the sub-tree, i.e., the probability that the determined type and direction of the link is correct, given its left and right children, i.e., P(T|L, R). For example, referring to FIG. 2, for determining a confidence score of the left sub-tree 201, the system and method of the present invention may compute a confidence score of the probability that the link 203 is composed of a noun modifier such that "three" so modifies "star." The system of the present invention may input as a feature the sub-tree's computed linking confidence score into the statistical model for computing the confidence score of the respective parse sub-tree.

History Score

In an example embodiment and/or method of the present invention, the system and method may compute the confidence scores described above in a bottom-up manner, i.e., for child sub-trees and then their parent sub-tree. For computing a confidence score of a parent sub-tree, the system may also include the computed confidence scores of the child sub-trees as features input into the statistical model, besides for the above-described confidence scores computed for the parent sub-tree. In one example embodiment and/or method of the present invention, the child history score feature may include one of two values, 0 and 1, where 0 represents a determination that the child sub-tree is incorrect based on its computed confidence score and 1 represents a determination that the child sub-tree is correct based on its computed confidence score. The correct and incorrect determinations are described in detail below with respect to equation 5. Further, combinations of the child sub-trees' confidence scores may be included as additional features input into the statistical model.

For example, where a combination of two child sub-trees of a considered sub-tree can be one of four correctness/incorrectness combinational values including the set of 11, 10, 01, and 00.

Lexical-Syntactic Features

Example embodiments and/or methods of the present invention may consider lexical-syntactic features which may include lexical, POS tag, and syntactic features.

Lexical and POS Tag Features

For a particular parse sub-tree, aside from the word-level and POS tag confidence scores, some of the words and POS tags themselves may be included in the model as features for calculating the parse sub-tree's confidence scores. In particular, the head and modifier words of the parse sub-tree and the head and modifier words of the two sub-tree children of the particular parse sub-tree, as well as their combinations may be included as features. For example, referring to FIG. 2, for the sub-tree "three star Chinese restaurant," the words "restaurant" as head and "star" as modifier for the particular sub-tree being considered, "star" as head and "three" as modifier of the left child sub-tree, "restaurant" as head and "Chinese" as modifier of the right child sub-tree, as well as the combination of all of these words of the principal sub-tree being considered and its two immediate sub-tree children, e.g., "three star Chinese restaurant" in the case shown in FIG. 2, may be included as features.

To avoid any potential data sparseness problem, the POS tags and hierarchical POS tags, each of which is assigned to words to which any of a respective plurality of POS tags are assigned, of the corresponding words mentioned above may also be included. Four hierarchical tags which may be included are, for example, Verb-related, Noun-related, Adjectives, and Adverbs, similar to the ones used in Zhang et al., *A Progressive Feature Selection Algorithm for Ultra Large Feature Spaces*, Proceedings of the 21$^{st}$ International Conference on Computational Linguistics and the 44$^{th}$ Annual Meeting of the ACL, pages 561-568, Sydney, Australia (2006), for edit region detection. For example, under the umbrella of the noun-related hierarchical POS tag (N) may be such POS tags as NN, NNS, NNP, and NNPS. Other levels of hierarchical POS tags derived either through linguistic intuition or empirical classifications can also be used as features for the same purpose. An example of such a tag in the hierarchy between Noun-related and members of the singular nouns (NN, NNP) is N-SINGULAR, under the umbrella of which may be NN and NNP.

In addition, POS tags and hierarchical POS tags of the words and phrase structures surrounding, structurally related to, or semantically related to the parse sub-tree in the same or adjacent utterances may also be included as features.

Syntactic Features

Latest developments in statistical parsing has shown that long distance structural features, i.e., multi-word features, result in improved performance (see, e.g., Collins, *Discriminative Reranking for Natural Language Parsing*, Machine Learning: Proceedings of the Seventh International Conference (ICML 2000), pages 175-182; Chamiak et al., *Coarse-to-Fine N-Best Parsing and MaxEnt Discriminative Reranking*, Proceedings of the 43$^{rd}$ Annual Meeting of the Association for Computational Linguistics (ACL 2005), pages 173-180). Some of the reported features, including structural information at various levels of a parse sub-tree, may be incorporated in the feature space to be considered for determining confidence scores at each parse sub-tree.

In an example embodiment of the present invention, syntactic structural characterizations of a sub-tree may be input as features into a model for calculating a confidence score for the sub-tree. Some of the syntactic structural characterizations which may be input into the statistical model may include, e.g., a dependency relation characteristic, an SL-JHD characteristic, an SL-JMD characteristic, an SL-JHMD characteristic, a JDR characteristic, an ML-JHD characteristic, an ML-JMD characteristic, an ML-JHMD characteristic, an HDLRN characteristic, and a sub-tree size. We have conducted tests showing that input of these characteristics as features into a model for calculating sub-tree confidence scores produces substantially accurate results.

Dependency Relation

Figure 3:
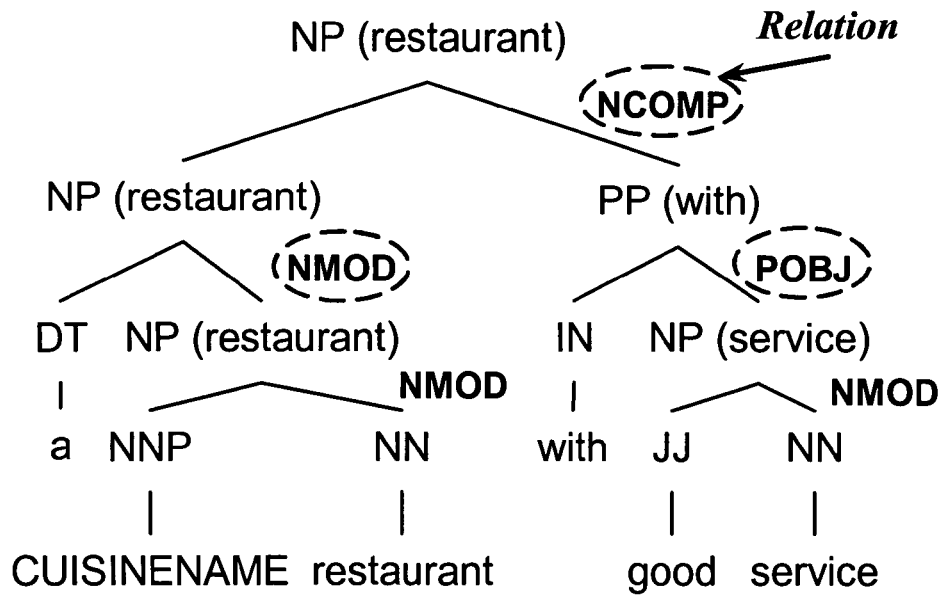
FIG. 3 shows an exemplary parse sub-tree and a dependency relation feature, according to an example embodiment and/or method of the present invention.

In an example embodiment of the present invention, the system and method may input dependency relations as features into the statistical model. The dependency relation of a sub-tree is the relationship between a head of the sub-tree and its modifier. Examples of the dependency relations are shown in FIG. 3 for each sub-tree of FIG. 3. At the top level of the sub-tree shown in FIG. 3, "with" modifies "restaurant" with the modifier type of NCOMP; at the second level, "service" modifies "with" with the modifier type of POBJ and "a" modifies "restaurant" with the modifier type of NMOD; and at the bottom level, "good" modifies "service" with the modifier type of NMOD and "CUISINENAME" modifies "restaurant" with the modifier type of NMOD.

In an example embodiment and/or method of the present invention, three dependency relations may be included as features for calculating a sub-tree's confidence score. For example, with respect to the top level of the sub-tree in FIG. 3, the three dependency relations NCOMP characterizing the top level, NMOD characterizing the top level of the considered sub-tree's immediate left child, and POBJ characterizing the top level of its immediate right child may be selectively included to the exclusion of the relations of lower levels, as shown in FIG. 3 by the dashed lines around the considered relations. The ordering of the dependency relations may be also considered. For example, the dependency relation features may be included in the CME model as [root relation, left relation, right relation], so that the dependency relations of the sub-tree of FIG. 3 may be included as [NCOMP, NMOD, POBJ].

Single Level Joint Head and Dependency Relation (SL-JHD)

In an example embodiment and/or method of the present invention, the system and method may input SL-JHD features into the statistical model. The SL-JHD feature is defined as a pair including (a) a head related term for a head of a single level of a sub-tree, including the head word, the head word's POS tag, or the head word's hierarchical POS tag, and (b) the head word's dependency relation (also referred to herein as its modifier type).

In particular, nine SL-JHD features may be considered, three for the top level of the considered sub-tree, and three apiece for each of the top levels of each of its immediate two sub-tree children.

The three SL-JHD features may include a first pair including a sub-tree's top level's head word and its dependency relation, a second pair including the sub-tree's top level's head word's pre-terminal POS tag and its dependency relation, and a third pair including the sub-tree's top level's head word's hierarchical POS tag and its dependency relation. The pre-terminal POS tag is the one assigned to the word at its lowest parse structure level.

Figure 4:
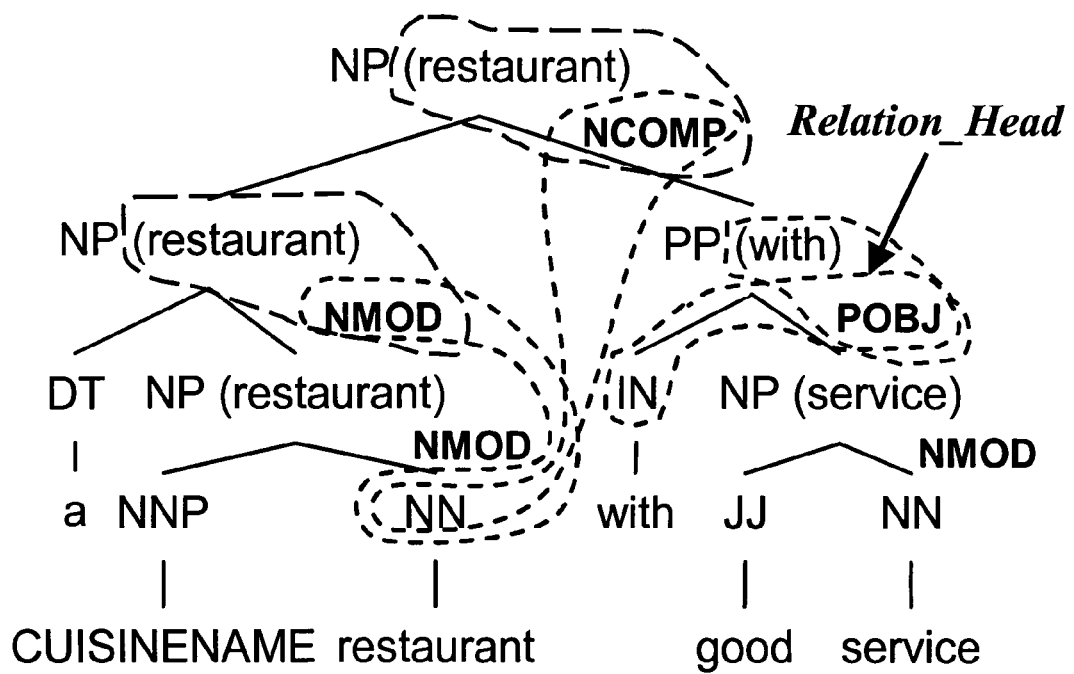
FIG. 4 shows an exemplary parse sub-tree and an SL-JHD feature, according to an example embodiment and/or method of the present invention.

For example, referring to the sub-tree shown in FIG. 4, the nine considered SL-JHD features may include "restaurant, NCOMP," "NN, NCOMP," and "N, NCOMP" of the top level; "restaurant, NMOD," "NN, NMOD," and "N, NMOD," for the top level of the left child sub-tree; and "with, POBJ," "IN, POBJ," and "ADV, POBJ" for the top level of the right child sub-tree.

Single Level Joint Mod and Dependency Relation (SL-JMD)

In an example embodiment and/or method of the present invention, the system and method may input SL-JMD features into the statistical model. The SL-JMD feature is defined as a pair including (a) a modifier related term for a modifier of a single level of a sub-tree, including the modifier word, the modifier word's POS tag, or the modifier word's hierarchical POS tag, and (b) the modifier word's dependency relation.

In particular, nine SL-JMD features may be considered, three for the top level of the considered sub-tree, and three apiece for each of the top levels of each of the sub-tree's immediate two sub-tree children.

The three SL-JMD features may include a first pair including a sub-tree's top level's modifier word and its dependency relation, a second pair including the sub-tree's top level's modifier word's POS tag and its dependency relation, and a third pair including the sub-tree's top level's modifier word's hierarchical POS tag and its dependency relation.

Figure 5:
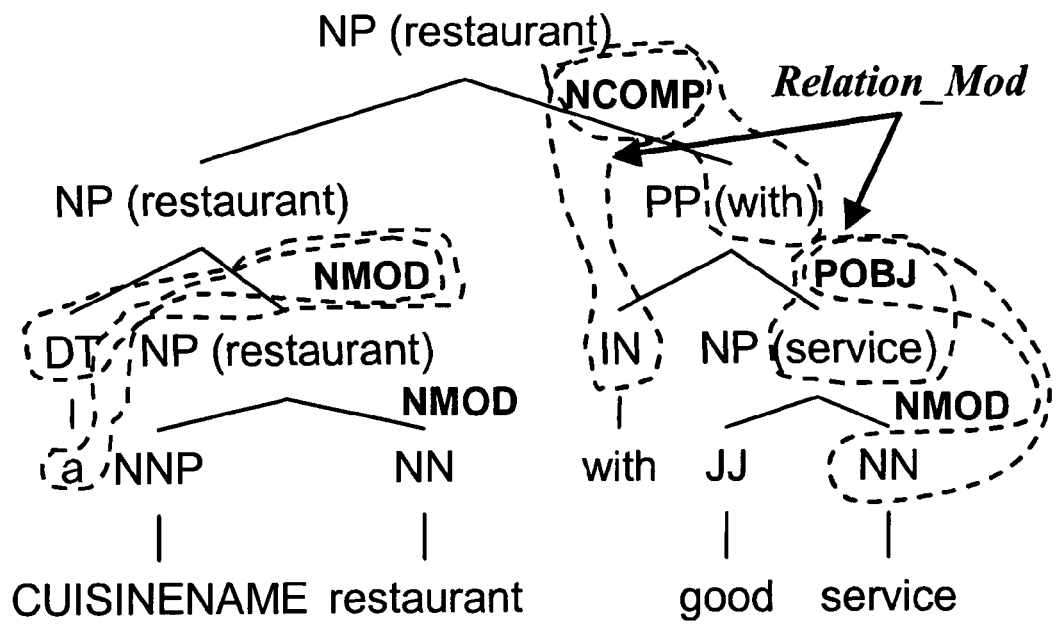
FIG. 5 shows an exemplary parse sub-tree and an SL-JMD feature, according to an example embodiment and/or method of the present invention.

For example, referring to the sub-tree shown in FIG. 5, the nine SL-JMD features may include "with, NCOMP," "IN, NCOMP," and "ADV, NCOMP" for the top level; "a, NMOD," "DT, NMOD," and "ADJ, NMOD" for the top level of the left child sub-tree; and "service, POBJ," "NN, POBJ," and "N, POBJ" for the top level of the right sub-tree.

Single Level Joint Head, Mod, and Dependency Relation (SL-JHMD)

In an example embodiment and/or method of the present invention, the system and method may input SL-JHMD features into the statistical model. The feature is defined as a group that includes one aspect in addition to those of the pair of the SL-JHD feature, i.e., a modifier related term for a modifier word corresponding to the head word for which the head word related term is included.

For example, corresponding to the first SL-JHD pair of [head word]/[modifier type] is a group that includes [head word]/[modifier type]/[modifier word]; corresponding to the second SL-JHD pair of [head word pre-terminal POS tag]/[modifier type] is a group that includes [head word pre-terminal POS tag]/[modifier type]/[modifier word pre-terminal POS tag]; and corresponding to the third SL-JHD pair of [head word hierarchical POS tag]/[modifier type] is a group that includes [head word hierarchical POS tag]/[modifier type]/[modifier word hierarchical POS tag]. Thus, the SL-JHMD features are considerations of two words (head word and modifier word) joined by some special relationship.

Figure 6:
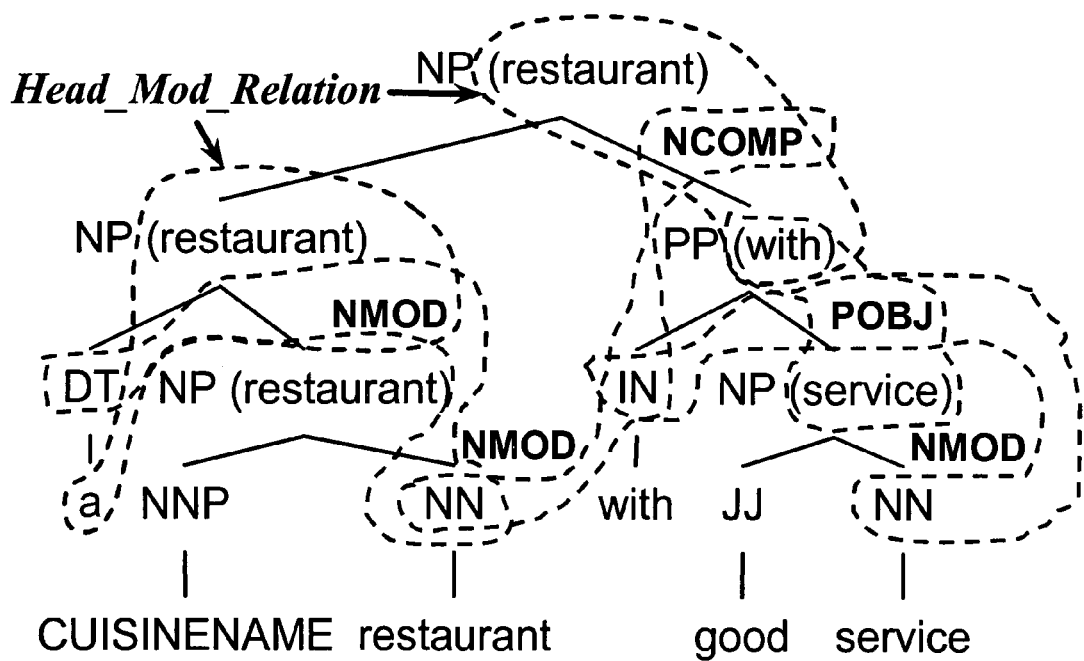
FIG. 6 shows an exemplary parse sub-tree and an SL-JHMD feature, according to an example embodiment and/or method of the present invention.

For example, three SL-JHMD features characterize the top level of the sub-tree shown in FIG. 6. The three SL-JHMD features include a first group including "restaurant, NCOMP, with," a second group including "NN, NCOMP, IN," and a third group including "N, NCOMP, ADV." Similar to SL-JHD, nine total features may be used, three for the sub-tree's top level and three apiece for each of the top level's of the sub-tree's immediate child sub-trees.

Joint Dependency Relation (JDR)

In an example embodiment and/or method of the present invention, the system and method may input JDR features into the statistical model. The JDR structural feature is a combination of all dependency relations of a sub-tree's considered level and all its sub-levels. combines. The relations may be ordered in a specific way, i.e., top-down and head-first.

Figure 7:
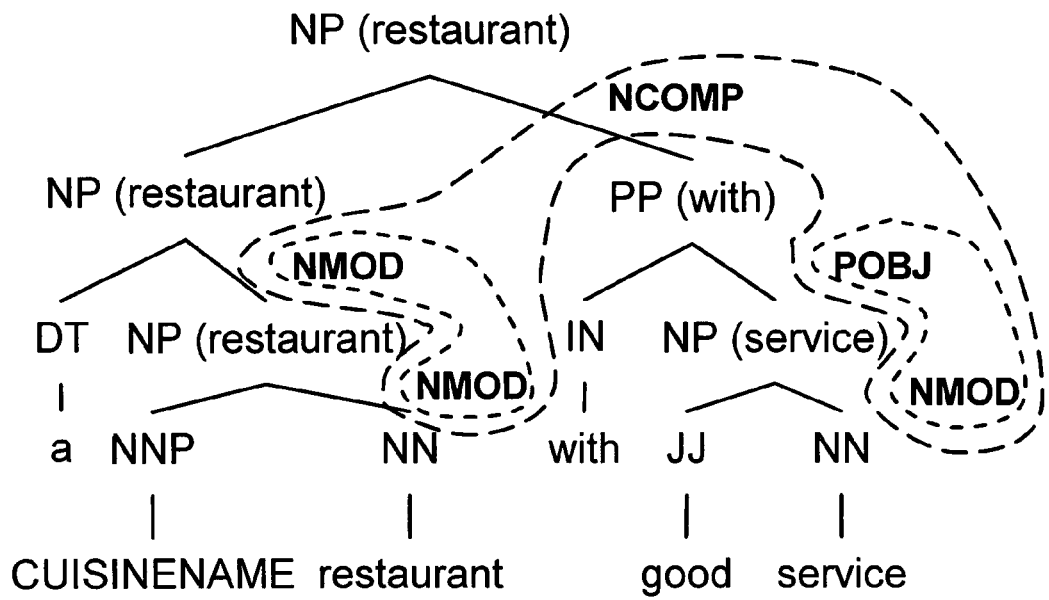
FIG. 7 shows an exemplary parse sub-tree and a JDR feature, according to an example embodiment and/or method of the present invention.

In an example embodiment and/or method of the present invention, to compute the confidence score of a given sub-tree, three JDRs may be included: a JDR for the entire sub-tree beginning at its top level down through all its sub-levels, a JDR for all levels of its left child sub-tree, and a JDR for all levels of its right child sub-tree. For example, referring to the sub-tree shown in FIG. 7, for calculating a confidence score for the sub-tree, the following three features may be included in the statistical model: "NCOMP, NMOD, NMOD, POBJ, NMOD," "N MOD, NMOD," and "POBJ, NMOD."

Multi-Level Joint Head and Dependency Relation (ML-JHD)

In an example embodiment and/or method of the present invention, the system and method may input ML-JHD features into the statistical model. The ML-JHD feature is defined as a group that includes for a considered level of a sub-tree, pairs of a head's hierarchical POS tag and the head's modifier type for each head of the considered level and all its sub-levels.

In an example embodiment and/or method of the present invention, three ML-JHD features may be considered for a sub-tree. For calculation of the sub-tree's confidence score, the ML-JHD feature groups may include a group including, for each head of all levels of the considered sub-tree, the modifier type and the head's hierarchical POS tag, and the same type of group for each immediate sub-tree child of the considered sub-tree.

Figure 8:
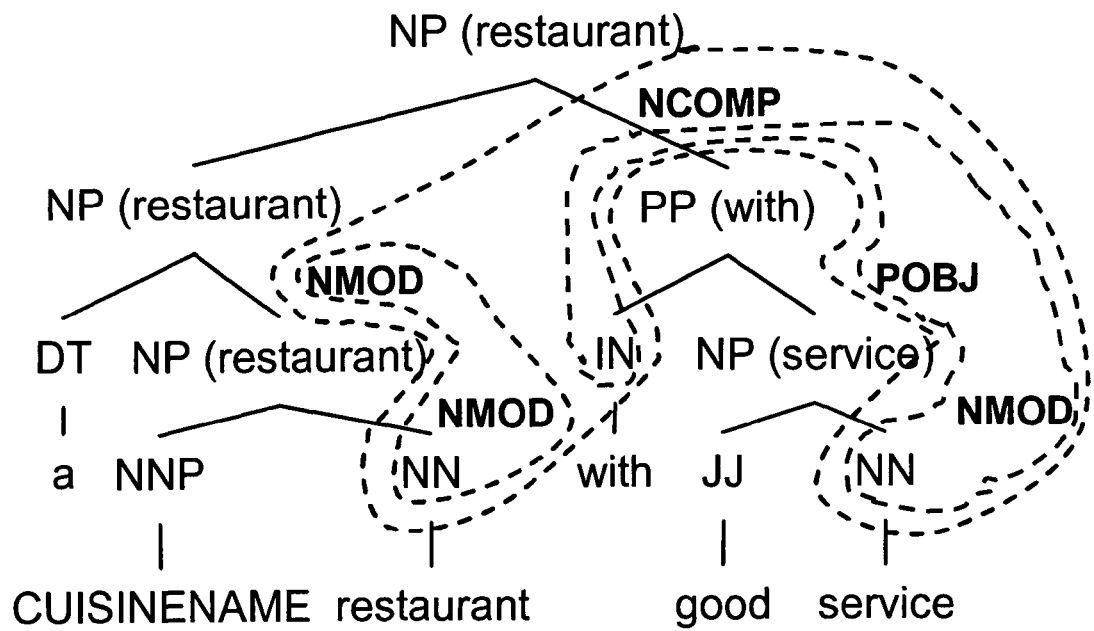
FIG. 8 shows an exemplary parse sub-tree and an ML-JHD feature, according to an example embodiment and/or method of the present invention.

For example, given the sub-tree structure in FIG. 8, "NCOMP, N; NMOD, N; NMOD, N; POBJ, ADV; NMOD, N" is the ML-JHD feature for the top level, "NMOD, N; NMOD, N" is the ML-JHD feature for the left child, and "POBJ, ADV; NMOD, N" is the ML-JHD feature of the right child. In FIG. 8, the heads' POS tags are encircled even though not considered to represent the consideration of the heads' hierarchical POS tags.

Multi-Level Joint Mod and Dependency Relation (ML-JMD)

In an example embodiment and/or method of the present invention, the system and method may input ML-JMD features into the statistical model. The ML-JMD feature is defined as a group that includes for a considered level of a sub-tree, pairs of a modifier's hierarchical POS tag and the modifier's modifier type for each modifier of the considered level and all its sub-levels.

In an example embodiment and/or method of the present invention, three ML-JMD features may be considered for a sub-tree. For calculation of the sub-tree's confidence score, the ML-JMD feature groups may include a group including, for each modifier of all levels of the considered sub-tree, the modifier type and the modifier's hierarchical POS tag, and the same type of group for each immediate sub-tree child of the considered sub-tree.

Figure 9:
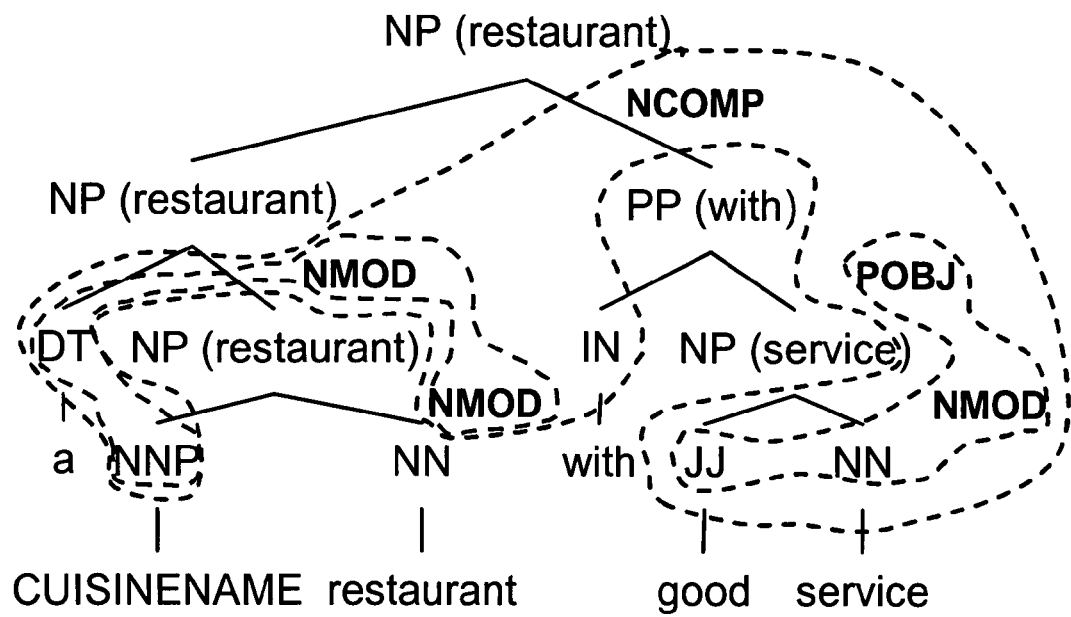
FIG. 9 shows an exemplary parse sub-tree and an ML-JMD feature, according to an example embodiment and/or method of the present invention.

For example, given the sub-tree in FIG. 9, "NCOMP, ADV; NMOD, ADJ; NMOD, N; POBJ, N; NMOD, ADJ" is the ML-JMD feature for the top level, "NMOD, ADJ; NMOD, N" is the ML-JMD feature for the left child, and "POBJ, N; NMOD, ADJ" is the ML-JMD feature of the right child. In FIG. 9, the modifiers' POS tags are encircled even though not considered to represent the consideration of the modifiers' hierarchical POS tags.

Multi-Level Joint Head, Mod, and Dependency Relation (ML-JHMD)

In an example embodiment and/or method of the present invention, the system and method may input ML-JHMD features into the statistical model. The ML-JHMD feature is defined as a group that includes for a considered level of a sub-tree, groups of a head's hierarchical POS tag, the head's modifier's hierarchical POS tag, and the head's modifier type for each head of the considered level and all its sub-levels.

In an example embodiment and/or method of the present invention, three ML-JHMD features may be considered for a sub-tree. For calculation of the sub-tree's confidence score, the ML-JHMD feature groups may include a group including, for each head of all levels of the considered sub-tree, the modifier type, the head word's hierarchical POS tag, and the modifier's hierarchical POS tag, and the same type of group for each immediate sub-tree child of the considered sub-tree.

Figure 10:
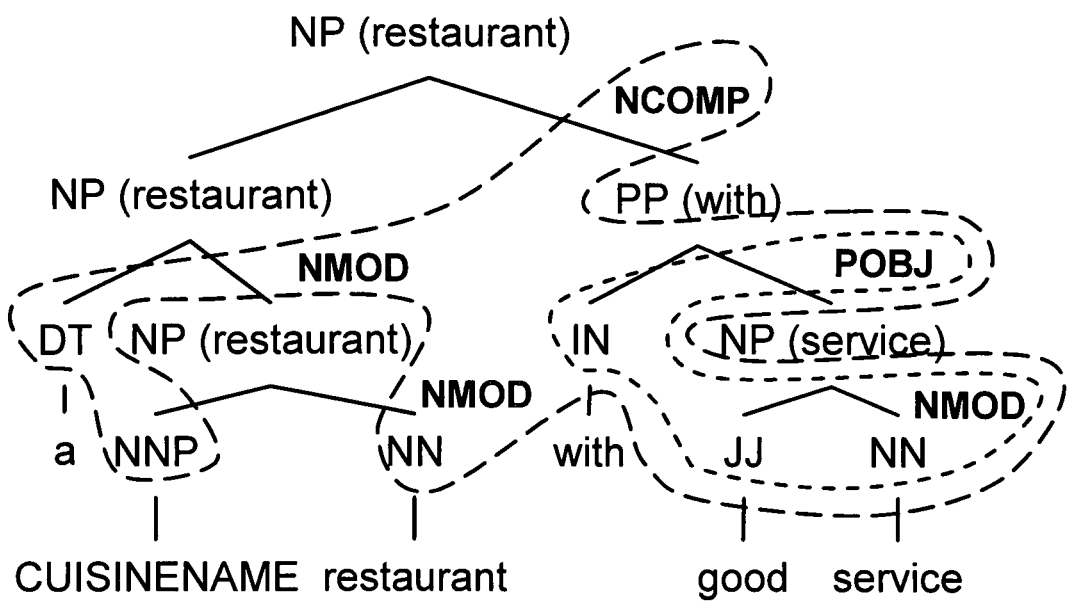
FIG. 10 shows an exemplary parse sub-tree and an ML-JHMD feature, according to an example embodiment and/or method of the present invention.

For example, given the sub-tree in FIG. 10, "NCOMP, N, ADV; NMOD, N, ADJ; NMOD, N, N; POBJ, ADV, N; NMOD, N, ADJ" is the ML-JHMD feature for the top level, "NMOD, N, ADJ; NMOD, N, N" is the ML-JHMD feature for the left child, and "POBJ, ADV, N; NMOD, N, ADJ" is the ML-JHMD feature of the right child. In FIG. 10, the heads' and modifiers' POS tags are encircled even though not considered to represent the consideration of the heads' and modifiers' hierarchical POS tags. Further, for clarity, only the right child sub-tree's feature group is shown.

Head, Dependency, and Left and Right Neighbors (HDLRN)

In an example embodiment and/or method of the present invention, the system and method may input an HDLRN feature into the statistical model for computing the confidence score of a sub-tree. HDLRN feature is defined as a group that includes the pre-terminal POS tag of the head word of the top level of the considered sub-tree, the dependency relation of the head word of the top level of the considered sub-tree, as well as the pre-terminal POS tags of said head word's neighboring words in the text string within a predetermined distance. Predetermined distances may be set for each of the right and left neighbors. The predetermined distances for the right and left neighbors may be set to the same or different values and may be set, for example, to a value equal to or more than 1.

Figure 11:
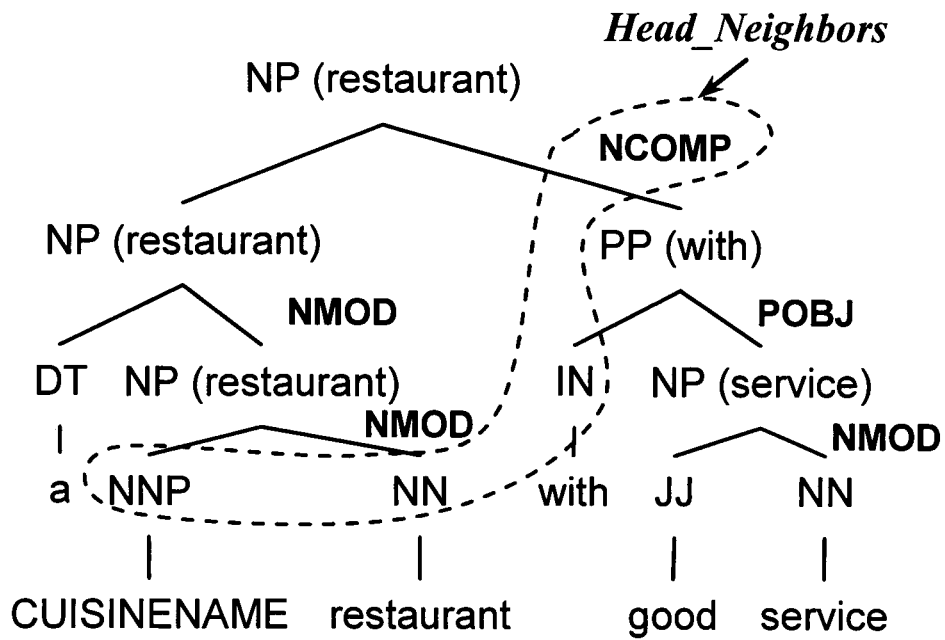
FIG. 11 shows an exemplary parse sub-tree and an HDLRN feature, according to an example embodiment and/or method of the present invention.

For example, given the sub-tree structure shown in FIG. 11 and a distance setting of l=1 and r=1, where l is the left distance setting and r is the right distance setting, the HDLRN feature for the sub-tree is "NN, NCOMP, NNP, IN, where "NN" is the pre-terminal POS tag of "restaurant," "NCOMP" is the modifier type of the dependency relation of the head word "restaurant," "NNP" is the pre-terminal POS tag of "CUISINENAME," the left neighbor of "restaurant," and "IN" is the pre-terminal POS tag of "with," the right neighbor of "restaurant."

In addition, the relational structures surrounding, structurally related to, or semantically related to the parse sub-tree in the same or adjacent utterances may also be included as features.

Size of the Sub-Tree

Figure 12:
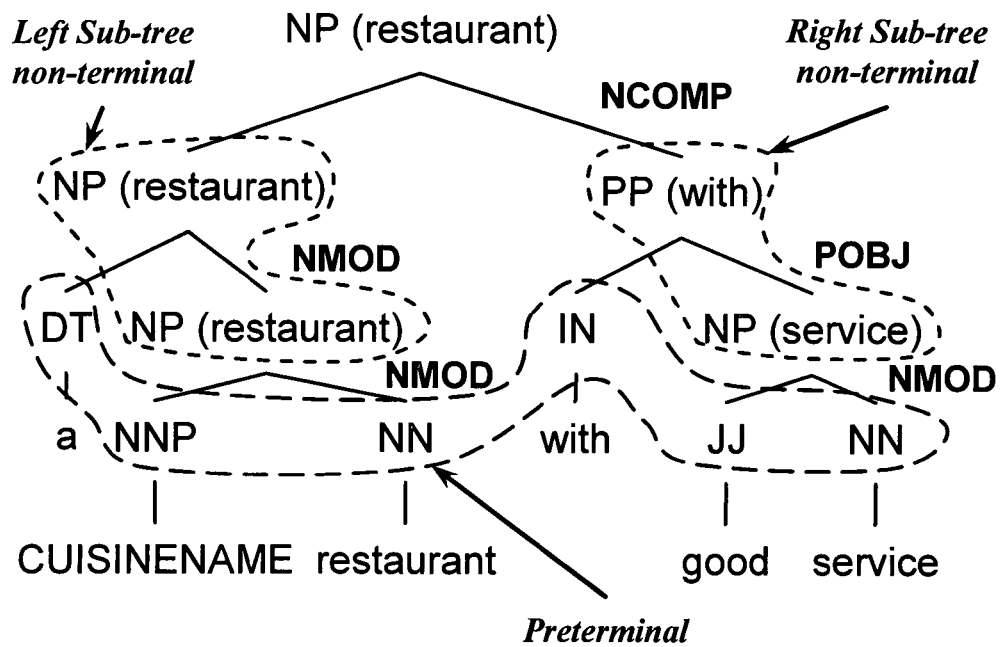
FIG. 12 shows an exemplary parse sub-tree and a sub-tree size feature, according to an example embodiment and/or method of the present invention.

In an example embodiment and/or method of the present invention, the system and method may input the sub-tree's size into the statistical model. The size of the sub-tree may be characterized by three numbers: the number of words derived from the given sub-tree measured as the number of pre-terminals, the number of the non-terminals derived from the left child, and the number non-terminals derived from the right child. For example, for the sub-tree shown in FIG. 12, the sub-tree size may be characterized as: pre-terminal=6, left child non-terminal=2, right child non-terminal=2.

Combination Features

In an example embodiment and/or method of the present invention, the system and method may input into the statistical model binary features representative of the considered parse sub-tree. For example, the binary feature may be based on the words that form the top and next lower levels of the considered parse sub-tree. Exemplary ones of the binary features are listed in Table 4.

TABLE 4

| Features binary combination | |
|---|---|
| Category | Features |
| Words | $W_iW_j$ |
| POS tags | $T_iT_j$ |
| Hierarchical POS tags | $HT_iHT_j$ |
| Words & POS tags | $W_iT_j$ |
| Words & Hierarchical POS tags | $W_iHT_j$ |

For example, with reference to FIG. 3, the word combinations of restaurant_a, restaurant_with, restaurant_service, a_with, a_service, and with_service; the POS tag combinations of NN_DT, NN_IN, NN_NN, DT_IN, DT_NN, and IN_NN; and similar combinations of hierarchical POS tags, word/POS tags, and word/hierarchical POS tags may be considered.

Semantic Features

In the CHAT dialogue system (see Weng et al., *CHAT: A Conversational Helper for Automotive Tasks*, Proceedings of the 9th International Conference on Spoken Language Processing (Interspeech/ICSLP), pages 1061-1064, Pittsburgh, Pa. (September 2006)), a proper name identification module extracts the proper names in the sentence. For example, in the sentence "go to a Golden Phoenix restaurant," "Golden Phoenix Restaurant" may be extracted as belonging to a "RESTAURANTNAME" slot.

In an example embodiment and/or method of the present invention, the system and method may include a feature indicating, for each head and modifier word of a sub-tree which is labeled as belonging to a proper name slot, whether the proper name has, among the system's n-best hypotheses, a different segmentation which overlaps the present segmentation. (If they are overlapped, there may be an increased likelihood that the parsing structure of the considered parse sub-tree is incorrect.) For example, if according to another of the n-best hypotheses of the segmentation of the above sentence, "A Golden Phoenix" is extracted as belonging to the "RESTAURANTNAME" slot, the words "Golden Phoenix" of the extracted "Golden Phoenix Restaurant" may each be assigned the number 1 for the overlapping feature indicating that it overlaps with another of the n-best hypotheses, i.e., "A Golden Phoenix."

Application of Features

Results of an experiment which tested, for parse sub-tree confidence score computation, various combinations of input features compared to baseline features including acoustic score, words, POS tags, and semantic features, show that use of the history score and syntactical features described above resulted the least annotation error. In the experiment, as shown in Table 5, only those sub-trees for which all the words of the corresponding input voice signals were correctly recognized and the POS tags and parse structure were correctly assigned were labeled as correct.

TABLE 5

Data annotation

| Speech Result | Parsing Sub Tree | Label |
|---|---|---|
| Correct | Correct | 1 |
| Correct | Incorrect | 0 |
| Incorrect | Correct | 0 |
| Incorrect | Incorrect | 0 |

In the experiment, use of only the baseline features resulted in a 6.5% annotation error rate, where:

$$\text{Annotation Error Rate} = \frac{\text{Number of incorrectly assigned trees}}{\text{Total number trees}}. \quad (4)$$

The experiment results using the additional described features are compared to use of just the baseline features. The comparisons are shown in Table 6.

TABLE 6

Summary of experiment result with different feature space

| | Feature Space Description | Annot. Error | Relative Error Decrease |
|---|---|---|---|
| Baseline | Base features: Acoustic score, words, POS tag, semantic features | 8.8% | \ |
| Set 1 | +History score | 6.2% | 29.5% |
| Set 2 | +History score + POS tag, Linking score | 5.9% | 33.0% |
| Set 3 | +History score + POS tag, Linking score + hierarchical tags | 5.8% | 34.1% |
| Set 4 | +History score + POS tag, Linking score + hierarchical tags + syntactic features | 5.1% | 42.0% |

The additional features were included in the following order: history score, POS tag score and linking score, hierarchical POS tag, and syntactic features. The first set, Set 1, includes the history score features in addition to the baseline features. This set provided a 2.6% decrease in annotation error rate and a relative error decrease of 29.5% over the baseline. The next addition, in Set 2, is the POS tag score and linking score features. This set provided a 2.9% reduction in annotation error rate and a relative error decrease of 33.0% over the baseline. The next addition, in Set 3, is the hierarchical POS tag features. This set provided a 3.0% reduction in annotation error rate and a relative error decrease of 34.1% over the baseline. The last addition, in Set 4, is the syntactic features. This set provided a 3.7% decrease in annotation error and a relative error decrease of 42.0% over baseline.

Further, to evaluate the effectiveness of each individual feature, we conducted four experiments where each new feature space was separately added to the baseline feature space separately as shown in Table 7.

TABLE 7

Comparison of different feature space

| | Feature Space Codes | Annot Error | Relative Error Decrease |
|---|---|---|---|
| Baseline | Base features | 8.8% | \ |
| Set 5 | Base features + History score | 6.2% | 29.5% |

TABLE 7-continued

Comparison of different feature space

| | Feature Space Codes | Annot Error | Relative Error Decrease |
|---|---|---|---|
| Set 6 | Base features + POS tag, Linking score | 8.2% | 6.8% |
| Set 7 | Base features + hierarchical tags | 8.8% | 0.0% |
| Set 8 | Base features + syntactic features | 7.0% | 20.5% |

In set 5, the history score was added to the baseline feature space, which resulted in a 2.6% decrease in annotation error rate and a relative error decrease of 29.5% over the baseline. In sets 6 and 7, the space of POS tag score and linking score and the space of hierarchical tag features were included, respectively. Both experiments only lead to small decreases in annotation errors. In set 8, the syntactic features were added to the baseline feature space, which resulted in a 1.8% decrease in annotation error rate and a relative error decrease of 20.5% over the baseline.

In an example embodiment and/or method of the present invention, the system and method may input some or all of the above-described features to calculate a confidence score for each sub-tree of an acoustically input text string. In an example embodiment and/or method, the computed confidence score may be a value in the range of 0 to 1, where 1 is most confident and 0 is least confident. A threshold or cut off point t may be selected for determining whether a parse sub-tree is correct, where:

$$sp \text{ is labeled as} \begin{cases} \text{correct,} & \text{if } P(sp \text{ is correct} | x) \geq t \\ \text{incorrect,} & \text{if } P(sp \text{ is correct} | x) < t \end{cases} \quad (5)$$

For example, the system and method may be configured to use 0.5 as the cut off point, such that any parse sub-tree for which a calculated confidence score is below 0.5, the system and method may disregard the parse sub-tree and ask the user to repeat the particular phrase corresponding to the disregarded sub-tree. Indeed, we have conducted experiments in which it has been found that 0.5 is a reasonable cut off point.

Figure 13:
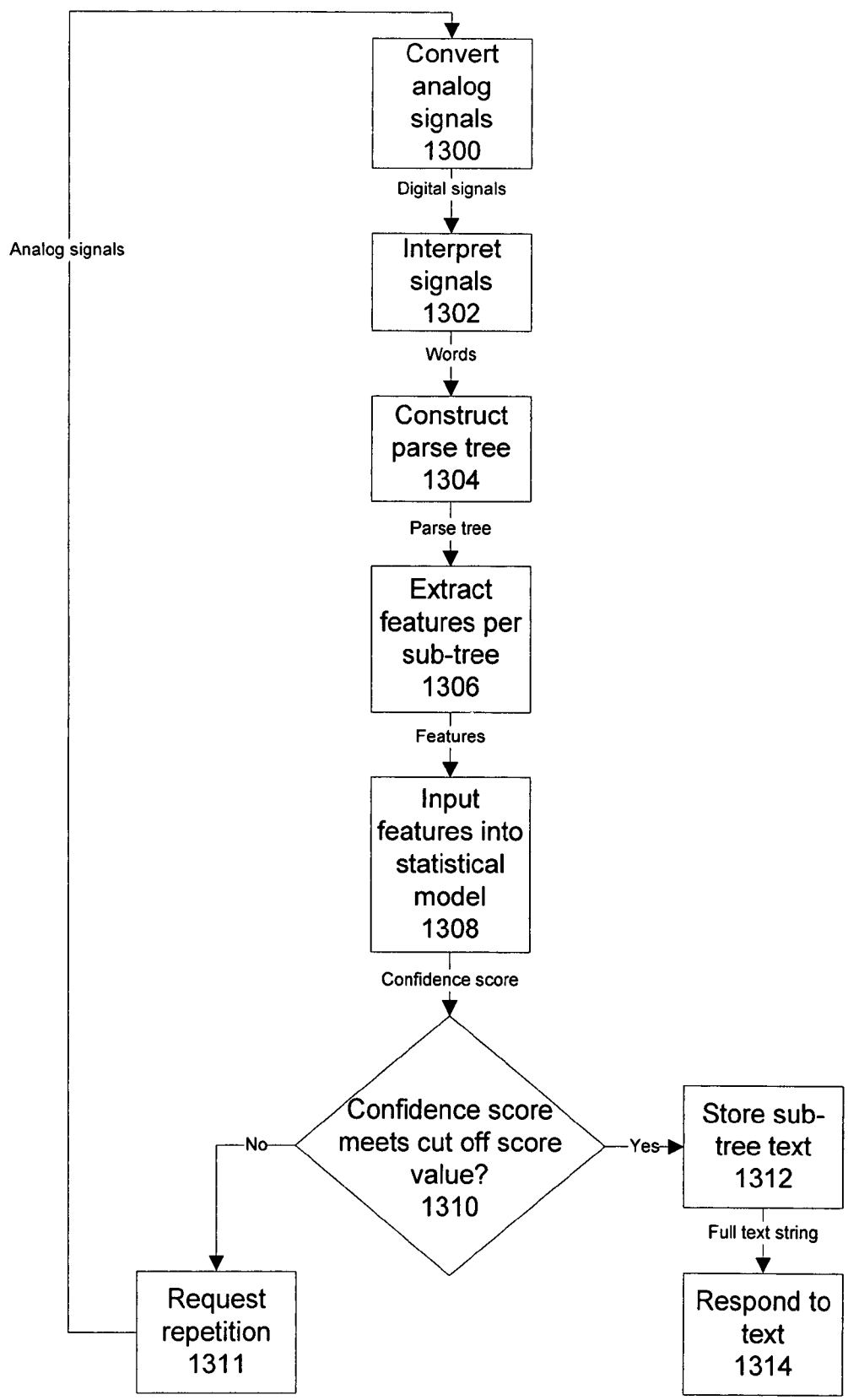
FIG. 13 is a flowchart illustrating a confidence computing method, according to an example embodiment and/or method of the present invention.

FIG. 13 is a flowchart that illustrates an example confidence computing method that may be performed according to an example embodiment or system of the present invention. At step 1300, the method or system may receive acoustical analog signals and convert them to digital signals. Conversion may be omitted, e.g., where the acoustical signals are received in a digital form. At step 1302, the method or system may interpret the signals as words. At step 1304, the method or system may construct, with the words obtained at step 1302, a parse tree representing a sentence.

At step 1306, the method or system may, for each sub-tree of the parse tree, extract a set of features for each of one or more feature categories, e.g., including one or more of the above-described feature categories, where the features represent the parse sub-tree. At step 1308, the method or system may, for each sub-tree, input the sub-tree's corresponding extracted features into a statistical model constructed based on the one or more feature categories for which the features were extracted and output a respective confidence score for each respective sub-tree. At step 1310, the method or system may, for each sub-tree, compare the respective confidence score to a preset cut off score value to determine whether the computed confidence score meets the cut off score value. For each sub-tree, if it is determined that the sub-tree confidence score does not meet the cut off score value, the method or system may, at step 1311, disregard the sub-tree's corresponding clause as incorrect and output a request for repetition of the sub-tree's corresponding clause. For each sub-tree, if it is otherwise determined that the sub-tree confidence score meets the cut off score value, the method or system may, at step 1312, store the sub-tree's corresponding text.

Once all of the text is obtained, the method or system may, at step 1314, respond to a request or instruction which the text represents. In an alternative example embodiment and/or method of the present invention, the method or system may respond to less than all of the initially input text. For example, less than the initially input text may correspond to one of a set of requests or instructions the system and method is configured to handle, so that repetition of a portion of the initially input text is not required. For example, of an entire sentence representing a request to play a song, the system and method might be configured to respond to [music source], [song name], and [artist name], without paying any attention to genre. Accordingly, for such a clause, even if determined to be incorrect, the method or system may skip step 1311, and move on to the next sub-tree.

Those skilled in the art can appreciate from the foregoing description that the present invention may be implemented in a variety of forms. Therefore, while the embodiments of the present invention have been described in connection with particular examples thereof, the true scope of the embodiments and/or methods of the present invention should not be so limited since other modifications will become apparent to the skilled practitioner upon a study of the drawings, specification, and following claims.

What is claimed is:

1. A confidence computing method, comprising performing the following by a processor of a computer:
   (a) generating a syntactical parse tree for an interpreted text string, the parse tree including a plurality of sub-trees, each of the sub-trees representing a corresponding section of the interpreted text string;
   (b) for each of at least one of the plurality of sub-trees:
      extracting at least one feature of the respective sub-tree; and
      determining whether the respective sub-tree is accurate, the accuracy determination including:
         computing a respective confidence score characterizing a probability of the respective sub-tree's accuracy, the confidence score being computed using a statistical model into which the at least one extracted feature is input; and
         determining whether the respective confidence score meets a predetermined threshold value, wherein:
            the respective sub-tree is determined to be accurate if it is determined that the respective sub-tree's confidence score meets the threshold value; and
            the respective sub-tree is otherwise determined to be inaccurate; and
   (c) subsequent to a determination, for at least one of the sub-trees, that the at least one sub-tree is accurate, providing an output based on the at least one sub-tree's at least one corresponding section of the interpreted text string;
   wherein the at least one feature includes a history score which includes, for each of at least one child sub-tree of the respective sub-tree, the respective child sub-tree's previously computed confidence score.

2. The method of claim 1, further comprising:
   (d) interpreting first speech signals as the interpreted text string, wherein (d) is performed prior to (a); and
   in (b), conditional upon a determination that the respective sub-tree is inaccurate, obtaining replacement speech signals for replacing the respective sub-tree and the respective sub-tree's corresponding section.

3. The method of claim 2, further comprising:
   performing (d) to (b) for the replacement speech signals.

4. The method of claim 1, wherein the statistical model includes a maximum entropy model.

5. The method of claim 4, further comprising:
   assigning a Part-Of-Speech (POS) tag to each word in the interpreted text string, wherein the syntactical parse tree represents the assignment of the POS tags.

6. The method of claim 5, wherein, in addition to the history score, the at least one feature includes at least one of a set of features, including:
   a parse-tree-word-level confidence score calculated based on respective word-level confidence scores of a plurality of words of the respective sub-tree;
   a POS-tag confidence score based on respective POS-tag scores computed for the POS tag assignments of the plurality of words of the respective sub-tree;
   a linking score representing a conditional probability of a link of a highest level of the respective sub-tree, the link including a dependency relation and a directionality;
   each of a plurality of words of the respective sub-tree's corresponding section of the interpreted text;
   each of the plurality of POS tags corresponding to the plurality of words of the respective sub-tree's corresponding section of the interpreted text;
   each of a plurality of multi-level hierarchical POS tags corresponding to the plurality of words of the respective sub-tree's corresponding section of the interpreted text;
   a dependency relation characteristic;
   a single level joint head and dependency relation (SL-JHD) characteristic;
   a single level joint mod and dependency relation (SL-JMD) characteristic;
   a single level joint head, mod, and dependency relation (SL-JHMD) characteristic;
   a joint dependency relation (JDR) characteristic;
   a multi-level joint head and dependency relation (ML-JHD) characteristic;
   a multi-level joint mod and dependency relation (ML-JMD) characteristic;
   a multi-level joint head, mod, and dependency relation (ML-JHMD) characteristic;
   a head, dependency, and left and right neighbors (HDLRN) characteristic;
   a sub-tree size characteristic; and
   a semantic slot feature.

7. The method of claim 6, wherein the at least one feature includes a combination of at least two of the set of features in addition to the at least one of the set.

8. The method of claim 6, wherein the at least one feature includes three dependency relation characteristics, including a first dependency relation of the highest level of the respective sub-tree and a second dependency relation and a third dependency relation of a next to highest level of the respective sub-tree.

9. The method of claim 6, wherein the at least one feature includes nine SL-JHD features, including three for each of the highest level of the respective sub-tree and left and right child sub-trees corresponding to a level immediately below the highest level of the respective sub-tree.

10. The method of claim 6, wherein the at least one feature includes nine SL-JMD features, including three for each of the highest level of the respective sub-tree and left and right child sub-trees corresponding to a level immediately below the highest level of the respective sub-tree.

11. The method of claim 6, wherein the at least one feature includes nine SL-JHMD features, including three for each of the highest level of the respective sub-tree and left and right child sub-trees corresponding to a level immediately below the highest level of the respective sub-tree.

12. The method of claim 6, wherein the at least one feature includes three sets of JDR features including:
   a first set that includes all dependency relations of all levels of the respective sub-tree;
   a second set that includes all dependency relations of all levels of a left sub-tree, the left sub-tree corresponding to a level immediately below the highest level of the respective sub-tree; and
   a third set that includes all dependency relations of all levels of a right sub-tree, the right sub-tree corresponding to the level immediately below the highest level of the respective sub-tree.

13. The method of claim 6, wherein the at least one feature includes three ML-JHD features, including one for each of the highest level of the respective sub-tree and left and right child sub-trees corresponding to a level immediately below the highest level of the respective sub-tree.

14. The method of claim 6, wherein the at least one feature includes three ML-JMD features, including one for each of the highest level of the respective sub-tree and left and right child sub-trees corresponding to a level immediately below the highest level of the respective sub-tree.

15. The method of claim 6, wherein the at least one feature includes three ML-JHMD features, including one for each of the highest level of the respective sub-tree and left and right child sub-trees corresponding to a level immediately below the highest level of the respective sub-tree.

16. The method of claim 6, wherein the at least one feature includes the sub-tree size characteristic, and the sub-tree size characteristic includes:
   a first value equal to a number of pre-terminals of the respective sub-tree;
   a second value equal to a number of non-terminals of a left child sub-tree corresponding to a level immediately below the highest level of the respective sub-tree; and
   a third value equal to a number of non-terminals of a right child sub-tree corresponding to the level immediately below the highest level of the respective sub-tree.

17. The method of claim 6, wherein:
   the POS-tag confidence score is calculated as a geometric mean of the respective POS-tag scores.

18. The method of claim 6, wherein:
   the dependency relation characteristic includes a first dependency relation characterizing the top level of a respective sub-tree, a second dependency relation characterizing the top level of the respective sub-tree's immediate left child, and a third dependency relation characterizing the top level of the respective sub-tree's immediate right child.

19. The method of claim 5, wherein the at least one feature includes at least one of a set of features, including:
   a parse-tree-word-level confidence score calculated based on respective word-level confidence scores of a plurality of words of the respective sub-tree and/or its surrounding sub-trees;
   a POS-tag confidence score based on respective POS-tag scores computed for the POS tag assignments of the plurality of words of the respective sub-tree and/or its surrounding sub-trees;
   a linking score representing a conditional probability of a link of a highest level of the respective sub-tree, the link including a dependency relation and a directionality;
   a linking score representing a conditional probability of a link of a highest level of the surrounding sub-trees, the link including a dependency relation and a directionality;
   a history score which includes, for each of at least one child sub-tree of the surrounding sub-trees, the surrounding child sub-trees' previously computed confidence score;
   each of a plurality of words of the respective sub-tree's corresponding section of the interpreted text;
   each of a plurality of words of the surrounding sub-trees' corresponding section of the interpreted text; each of the plurality of POS tags corresponding to the plurality of words of the respective sub-tree's corresponding section of the interpreted text;
   each of the plurality of POS tags corresponding to the plurality of words of the surrounding sub-trees' corresponding section of the interpreted text;
   each of a plurality of multi-level hierarchical POS tags corresponding to the plurality of words of the respective sub-tree's corresponding section of the interpreted text;
   each of a plurality of multi-level hierarchical POS tags corresponding to the plurality of words of the surrounding sub-trees' corresponding section of the interpreted text;
   a dependency relation characteristic;
   a single level joint head and dependency relation (SL-JHD) characteristic;
   a single level joint mod and dependency relation (SL-JMD) characteristic;
   a single level joint head, mod, and dependency relation (SL-JHMD) characteristic;
   a joint dependency relation (JDR) characteristic;
   a multi-level joint head and dependency relation (ML-JHD) characteristic;
   a multi-level joint mod and dependency relation (ML-JMD) characteristic;
   a multi-level joint head, mod, and dependency relation (ML-JHMD) characteristic;
   a head, dependency, and left and right neighbors (HDLRN) characteristic;
   a sub-tree size characteristic; and
   a semantic slot feature.

20. The method of claim 19, wherein the at least one feature includes a combination of at least two of the set of features in addition to the at least one of the set.

21. The method of claim 19, wherein the at least one feature includes three dependency relation characteristics, including a first dependency relation of the highest level of the surrounding sub-trees and a second dependency relation and a third dependency relation of a next to highest level of the surrounding sub-trees.

22. The method of claim 19, wherein the at least one feature includes nine SL-JHD features, including three for each of the highest level of the surrounding sub-trees and left and right child sub-trees corresponding to a level immediately below the highest level of the surrounding sub-trees.

23. The method of claim 19, wherein the at least one feature includes nine SL-JMD features, including three for each of the highest level of the surrounding sub-trees and left and right child sub-trees corresponding to a level immediately below the highest level of the surrounding sub-trees.

24. The method of claim 19, wherein the at least one feature includes nine SL-JHMD features, including three for each of the highest level of the surrounding sub-trees and left and right child sub-trees corresponding to a level immediately below the highest level of the surrounding sub-trees.

25. The method of claim 19, wherein the at least one feature includes three sets of JDR features including:
   a first set that includes all dependency relations of all levels of the surrounding sub-trees;
   a second set that includes all dependency relations of all levels of a left sub-tree, the left sub-tree corresponding to a level immediately below the highest level of the surrounding sub-trees; and
   a third set that includes all dependency relations of all levels of a right sub-tree, the right sub-tree corresponding to the level immediately below the highest level of the surrounding sub-trees.

26. The method of claim 19, wherein the at least one feature includes three ML-JHD features, including one for each of the highest level of the surrounding sub-trees and left and right child sub-trees corresponding to a level immediately below the highest level of the surrounding sub-trees.

27. The method of claim 19, wherein the at least one feature includes three ML-JMD features, including one for each of the highest level of the surrounding sub-trees and left and right child sub-trees corresponding to a level immediately below the highest level of the surrounding sub-trees.

28. The method of claim 19, wherein the at least one feature includes the sub-tree size characteristic, and the sub-tree size characteristic includes:
   a first value equal to a number of pre-terminals of the surrounding sub-trees;
   a second value equal to a number of non-terminals of a left child sub-tree corresponding to a level immediately below the highest level of the surrounding sub-trees; and
   a third value equal to a number of non-terminals of a right child sub-tree corresponding to the level immediately below the highest level of the surrounding sub-trees.

29. A non-transitory computer-readable medium having stored thereon instructions to be executed by a processor, the instructions which, when executed, cause the processor to determine a confidence by performing the following:
   (a) generating a syntactical parse tree representing an interpreted text string, the parse tree including a plurality of sub-trees, each of the sub-trees representing a corresponding section of the interpreted text string;
   (b) for each of at least one of the plurality of sub-trees:
      extracting at least one feature of the respective sub-tree; and
      determining whether the respective sub-tree is accurate, the accuracy determination including:
         computing a respective confidence score characterizing a probability of the respective sub-tree's accuracy, the confidence score being computed using a statistical model into which the at least one extracted feature is input; and
         determining whether the respective confidence score meets a predetermined threshold value, wherein:
            the respective sub-tree is determined to be accurate if it is determined that the respective sub-tree's confidence score meets the threshold value; and
            the respective sub-tree is otherwise determined to be inaccurate; and
   (c) subsequent to a determination, for at least one of the sub-trees, that the at least one sub-tree is accurate, providing an output based on the at least one sub-tree's at least one corresponding section;
   wherein the at least one feature includes a history score which includes, for each of at least one child sub-tree of the respective sub-tree, the respective child sub-tree's previously computed confidence score.

30. A confidence computing system, comprising:
a processor configured to:
   (a) interpret first speech signals as a text string;
   (b) generate a syntactical parse tree representing the interpreted text string, the parse tree including a plurality of sub-trees, each of the sub-trees representing a corresponding section of the interpreted text string;
   (c) for each of at least one of the plurality of sub-trees:
      extract at least one feature of the respective sub-tree;
      determine whether the respective sub-tree is accurate, the accuracy determination including:
         computation of a respective confidence score characterizing a probability of the respective sub-tree's accuracy, the confidence score being computed using a statistical model into which the at least one extracted feature is input; and
         determination of whether the respective confidence score meets a predetermined threshold value, wherein:
            the respective sub-tree is determined to be accurate if it is determined that the respective sub-tree's confidence score meets the threshold value; and
            the respective sub-tree is otherwise determined to be inaccurate; and
      conditional upon a determination that the respective sub-tree is inaccurate, obtain replacement speech signals for replacing the respective sub-tree and the respective sub-tree's corresponding section; and
   (d) subsequent to a determination, for at least one of the sub-trees, that the at least one sub-tree is accurate, provide an output based on the at least one sub-tree's at least one corresponding section;
   wherein the at least one feature includes a history score which includes, for each of at least one child sub-tree of the respective sub-tree, the respective child sub-tree's previously computed confidence score.

31. A confidence computing method, comprising performing the following by a processor of a computer:
   (a) generating a syntactical parse tree for the interpreted text string, the parse tree including a plurality of sub-trees, each of the sub-trees representing a corresponding section of the interpreted text string;
   (b) for each of at least one parent sub-tree of the plurality of sub-trees:
      extracting at least one feature of the respective parent sub-tree; and
      determining whether the respective parent sub-tree is accurate, the accuracy determination including:
         computing a respective confidence score characterizing a probability of the respective parent sub-tree's accuracy, the confidence score being computed using a statistical model into which the at least one extracted feature is input; and
         determining whether the respective confidence score meets a predetermined threshold value, wherein:
            the respective parent sub-tree is determined to be accurate if it is determined that the respective sub-tree's confidence score meets the threshold value; and
            the respective parent sub-tree is otherwise determined to be inaccurate; and
   (c) subsequent to a determination, for at least one of the sub-trees, that the at least one sub-tree is accurate, providing an output based on the at least one sub-tree's at least one corresponding section of the interpreted text string;

wherein the at least one feature includes a linking score representing a conditional probability of a link of a highest level of the respective parent sub-tree, the link including a dependency relation and a directionality.

32. The method of claim 19, wherein the at least one feature includes three ML-JHMD features, including one for each of the highest level of the surrounding sub-trees and left and right child sub-trees corresponding to a level immediately below the highest level of the surrounding sub-trees.

33. The method of claim 31, wherein the conditional probability is a probability that a determined type and direction of the link is correct given right and left child sub-trees of the respective parent sub-tree.

34. A confidence computing method, comprising performing the following by a processor of a computer:

generating a syntactical parse tree for an interpreted text string, the parse tree including a plurality of sub-trees, each of the sub-trees representing a corresponding section of the interpreted text string; and for a parent sub-tree of the plurality of sub-trees, the parent sub-tree formed by a combination of a plurality of child sub-trees, determining whether the parent sub-tree is accurate, the accuracy determination including:

computing a parent confidence score characterizing a probability of the parent sub-tree's accuracy, the computation of the parent confidence score including inputting into a statistical model a respective child confidence score previously calculated for each of the plurality of child sub-trees; and determining whether the parent confidence score meets a predetermined threshold value, wherein the parent sub-tree is determined to be accurate if it is determined that the parent sub-tree's confidence score meets the threshold value, and the parent sub-tree is otherwise determined to be inaccurate.

35. The method of claim 34, further comprising:

responsive to determining in the determining step that the parent sub-tree is accurate, providing an output based on the parent sub-tree's corresponding section of the interpreted text string.

36. A confidence computing method, comprising performing the following by a processor of a computer:

generating a syntactical parse tree for an interpreted text string, the parse tree including a plurality of sub-trees, each of the sub-trees representing a corresponding section of the interpreted text string; and for a parent sub-tree of the plurality of sub-trees, the parent sub-tree formed by a combination of a plurality of child sub-trees, determining whether the parent sub-tree is accurate, the accuracy determination including:

assigning to each of the child sub-trees a respective accuracy value;

computing a parent confidence score characterizing a probability of the parent sub-tree's accuracy, the computation of the confidence score including inputting into a statistical model the accuracy values assigned to the child sub-trees; and determining whether the parent confidence score meets a predetermined threshold value, wherein the parent sub-tree is determined to be accurate if it is determined that the parent sub-tree's confidence score meets the threshold value, and the parent sub-tree is otherwise determined to be inaccurate.

37. The method of claim 36, wherein:

the accuracy determination further includes computing for each of the child sub-trees a respective child confidence score; and for each of the child sub-trees, the assignment of the respective accuracy value is based on the child confidence score computed for the child sub-tree.

\* \* \* \* \*